March 7, 1967 E. R. PURDY 3,307,887
WEDGE
Filed Oct. 1, 1964 2 Sheets-Sheet 1

Eugene R. Purdy,
Inventor.
Koenig, Senniger, Powers and Leavitt,
Attorneys.

March 7, 1967    E. R. PURDY    3,307,887
WEDGE

Filed Oct. 1, 1964    2 Sheets-Sheet 2

# United States Patent Office 3,307,887
Patented Mar. 7, 1967

3,307,887
WEDGE
Eugene R. Purdy, 6051 Pernod, St. Louis, Mo. 63139
Filed Oct. 1, 1964, Ser. No. 400,656
9 Claims. (Cl. 308—55)

This invention relates to a shock absorbing wedge for a railway car journal box.

Railway cars always encounter some side sway or motion during movement. This motion is relatively sharp when the car is travelling around a curve or through a switch yard where the switches (called frogs) cause sharp movement of the car. This side motion of the car causes relative movement between the car journal box and the journal of the truck which supports it, thereby causing shocks to be transmitted to the journal box, journal and the journal bearing and wedge therebetween. Eventually, the flange on the inner end of the journal bearing may break under repeated shock and the outer end of the bearing then rides on the collar at the outer end of the journal. Excessive friction developed between the bearing and the journal collar then causes heating in the journal box, producing a so-called "hot box."

Among the several objects of the present invention may be noted the provision of a wedge for reducing shock loads between a railway car journal box and its journal caused by side sway or motion of the car during movment; the provision of such shock absorbing wedges compatible with conventional journal bearings and journal boxes; the provision of such improved shock absorbing wedges in which shocks are absorbed by compression and wherein the portions of the wedge that absorb the shock are substantially free of shear forces; and the provision of such a shock absorbing wedge for railway cars in which there is substantially no interference with the wedge's normal function of supporting the journal box on the journal bearing. Other objects and features will be in part apparent and in part pointed out hereinafter.

The invention accordingly comprises the constructions hereinafter described, the scope of the invention being indicated in the following claims.

In the accompany drawings, in which several of various possible embodiments of the invention are illustrated, FIG. 1 is a perspective of a wedge of this invention for use with so-called flat back journal bearings;

Corresponding reference characters indicate corresponding parts throughout the several views of the drawings.

Figure 1:
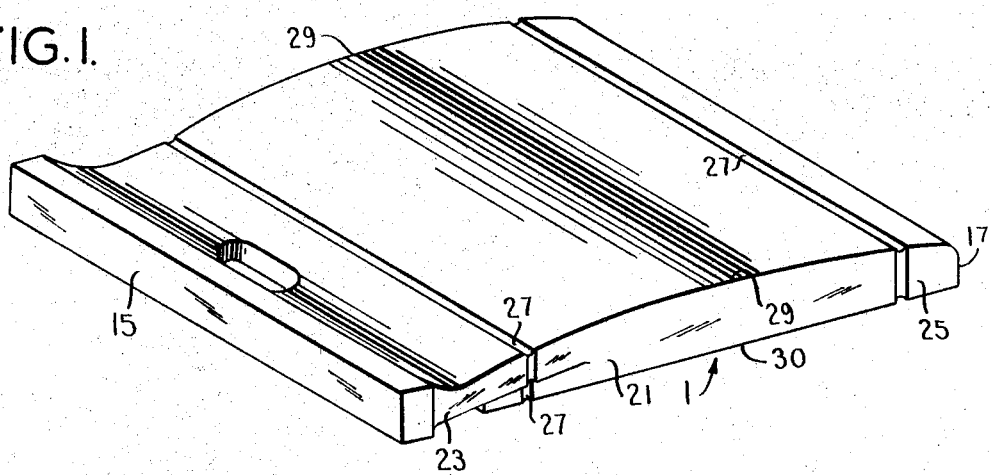
Figure 2:
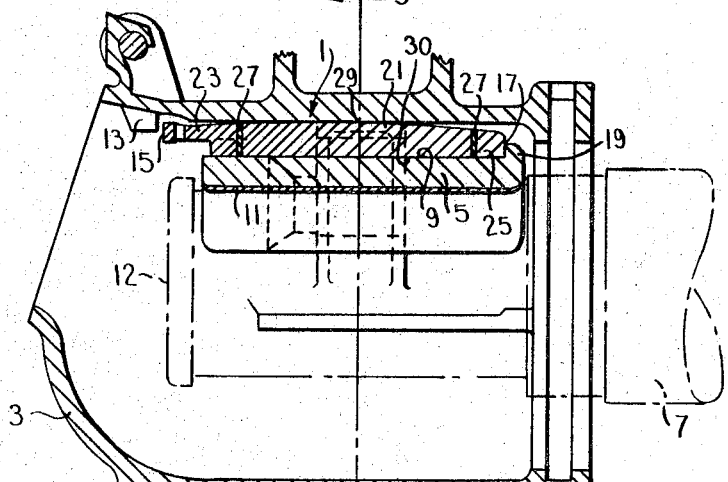
FIG. 2 is a longitudinal section showing the FIG. 1 wedge installed in a journal box.
Figure 3:
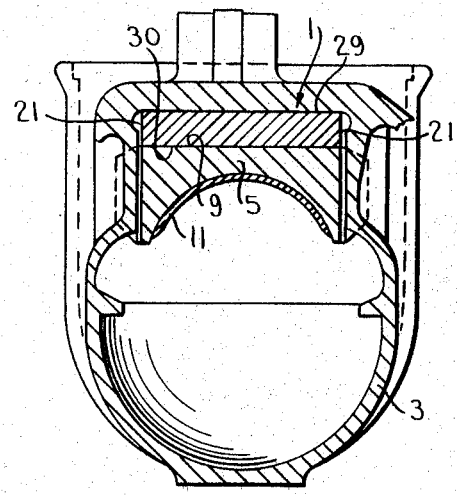
FIG. 3 is a section taken on line 3—3 of FIG. 2.

Referring to the drawings a wedge 1 of this invention is shown per se in FIG. 1. Illustrated in FIGS. 2 and 3 is a conventional railway car journal box 3 which supports the car. A journal bearing 5 riding on a journal 7 of a truck (not shown) supports the box 3. The upper surface 9 of journal bearing 5 is flat (a "flat back bearing") and on its lower surface which straddles journal 7 there is a layer of anti-friction material 11, such as a Babbitt metal. The bottom of journal box 3 is spaced from journal 7 providing a space for a lubricator pad or waste material (not shown) for feeding lubricant from the bottom of the journal box to the journal. At the outer end of journal 7 is a collar 12 which limits outward movement of bearing 5. Depending from the top of journal box 3 is a lug 13 which engages the outer end 15 of wedge 1 as journal box 3 shifts inward relative to journal 7. The inner end 17 of wedge 1 engages a flange or shoulder 19 at the inner end of journal 5 during shifting of the journal box. As journal box 3 shifts inward (to the right as viewed in FIG. 2) forcing lug 13 against the wedge, the wedge (and bearing shoulder 19) receive a substantial shock. The wedges of this invention absorb at least a portion of this shock.

Referring to FIG. 1, wedge 1 is shown to comprise a center segment 21, an outer end segment 23 and an inner end segment 25. Each segment is generally rectangular in plan and is preferably made of a rigid metal. The outer end 15 of wedge 1 is the outer end face of segment 23 and the inner end 17 of the wedge is the outer end face of segment 25. Strips 27 of compressible elastomeric material join end segments 23, 25 to center segment 21. The material 27 may be rubber, synthetic rubber, suitable plastics, etc., and the metal-to-elastomer bond may be accomplished by conventional molding, adhesive or bonding techniques. Material 27 is sandwiched between the wedge segments and does not normally project above or below the top or bottom surfaces of the wedge where it could interfere with normal metal-to-metal contact between the wedge and the journal bearing or journal box.

The center segment 23 is formed with a ridge or crown 29 on which journal box 3 rests. Crown 29 permits some rocking of the journal box on the wedge without lifting journal bearing 5 from journal 7. In the absence of crown 29, rocking of the journal box might lift the journal bearing and permit waste to enter the space between the journal and the bearing.

The weight of the journal box and the car which it supports is transmitted through the crowned center segment 21 to the journal bearing 5 due to the provision of crown 29 on this center segment. Since the center segment 21 must support a heavy load, the endwise dimension (endwise of bearing 5) of the center segment 21 is preferably substantially greater than the endwise dimension of either of the segments 23 and 25. In the wedge shown in the drawings, the endwise dimension of center segment is more than twice that of the end segments. The center segment 21 is made relatively large to obtain a large area of contact between its flat lower surface 30 and the flat upper surface 9 of bearing 5 so that there is a minimum load on a given area of the bottom 30 of the center segment. The end segments and elastomer strips carry substantially none of the weight of the journal box 3 and the car it supports.

With the wedge 1 mounted between journal 5 and journal box 3 as shown in FIGS. 2 and 3, the weight of the car is transferred directly through wedge 1 and bearing 5 to journal 7. When side motion of the car moves the journal box to the right (as viewed in FIG. 2), lug 13 engages the outer end 15 of wedge 1, urging the inner end 17 of the wedge against shoulder 19 on bearing 5 and resulting in a substantial shock on the wedge. This force between ends 15 and 17 of the wedge is absorbed by compression of the resilient elastomeric material in joints 27. This reduces the amount of force delivered to shoulder 19 of the journal bearing as well as the shock received by the journal itself. By elimination or at least substantial reduction in the shock delivered to the journal and journal bearing, there is less wear on the journal and journal bearing and there is less likelihood that the shoulder 19 will be broken off by these forces. As previously stated, typical prior art wedges which do not absorb these shocks transmit this shock to the shoulder 19 and eventually this shoulder breaks off the bearing. Subsequent movement of the journal box 3 in an axial direction relative to journal 7 moves the journal bearing 5 to the left into engagement with the collar 12 on the journal 7 where excessive friction develops between these parts, resulting in a so-called hot box.

Figure 4:
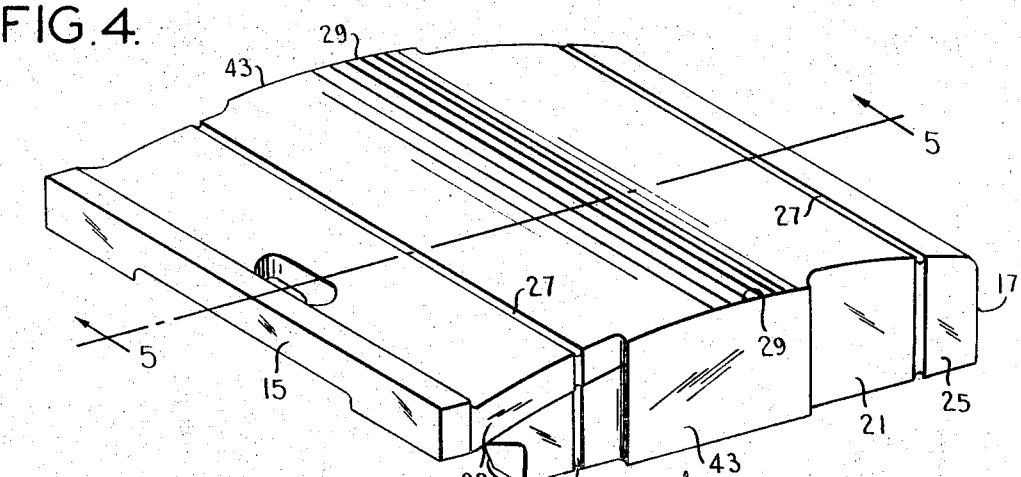
FIG. 4 is a perspective of a wedge of the invention for use with so-called steeple back journal bearings.
Figure 5:
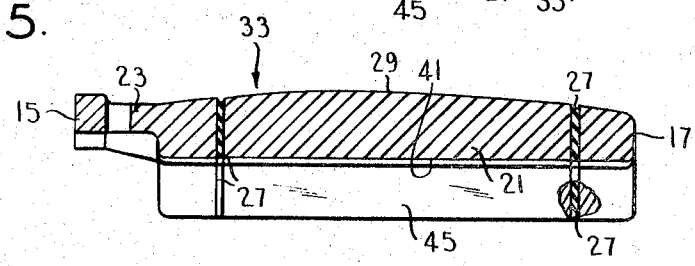
FIG. 5 is a section taken on line 5—5 of FIG. 4.
Figure 6:
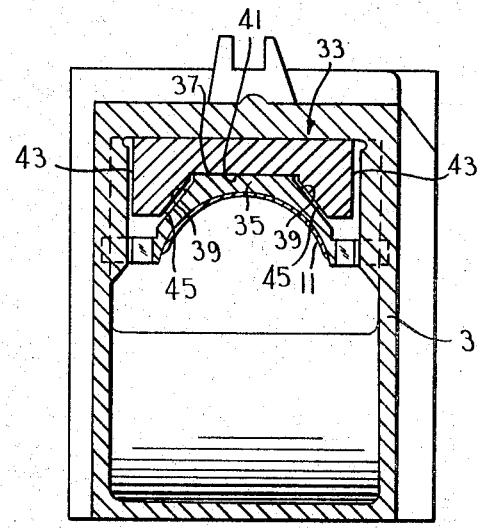
FIG. 6 is a transverse section through a journal box showing the wedge of FIGS. 4 and 5 mounted in the journal box.

FIGS. 4–6 illustrate another embodiment of the wedge of the invention. The FIGS. 4–6 wedge is designated generally 33 and is similar to wedge 1 except that its component segments are channel-shaped on the bottom for engagement with a conventional steeple back journal bearing shown at 35 in FIG. 6 which has an outer surface comprising a flat longitudinally extending center surface 37 and side surfaces 39 inclined downwardly from its side edges. Wedge 33 has a bottom surface comprising a relatively flat center portion 41 substantially the same width as bearing surface 37 which extends generally from the outer end edge 15 to the inner end edge 17 of the wedge. Depending from opposite sides of the wedge 33 are legs 43, each of which has an inclined inner surface 45 forming part of the bottom surface of the wedge. Surfaces 45 are generally parallel to but spaced slightly from the surfaces 39 on the bearings 35. The elastomeric material 27 extends through legs 43 as shown in FIGS. 4 and 5. The outer surfaces of legs 43 and the top of the wedge 33 fit relatively closely to the walls of journal box 3. This prevents the wedge and bearing from rotating with the journal. In other respects, wedge 33 and its application are the same as that previously set forth in connection with FIGS. 1–3.

While the wedges 1 and 33 have been shown with three segments and two joints 27 of the elastomeric material, it will be understood that the number of segments and joints can be varied depending upon the application of the wedges and the shock loads to be encountered.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A shock absorbing wedge for mounting between a railway car journal box and a journal bearing, said wedge comprising an assembly of a plurality of rigid segments arranged end-to-end of the wedge with elastomeric material between adjacent segments and bonded thereto so as to form resilient joints between the segments for absorbing shocks imposed endwise of the wedge, a central one of said segments being longer than the other segments and crowned relative to said other segments.

2. A wedge as set forth in claim 1 wherein the segments are flat-bottomed with their bottoms generally coplanar for engagement with a flat-back journal bearing.

3. A wedge as set forth in claim 1 wherein the segments are channel-shaped on the bottom for engagement with a steeple back journal bearing.

4. A wedge as set forth in claim 1 wherein the joints are spaced from the crown whereby they are substantially free of compressive loads between the crown and the lower surface of the center segment.

5. A shock absorbing wedge for mounting between the top of a railway car journal box and a journal bearing, the wedge having inner and outer ends for engaging a shoulder on the journal bearing and a lug on the journal box, respectively, the wedge having on its upper surface between said ends a crown on which the journal box rests, the wedge being divided into a plurality of rigid segments between its ends with adjacent segments being joined by a strip of elastomeric material for absorbing by compression shocks received by the wedge by engagement with the lug or the shoulder.

6. A wedge as set forth in claim 5 wherein the lower surface of the wedge is substantially flat for resting on a flat back of the journal bearing.

7. A wedge as set forth in claim 5 wherein the wedge has legs depending from its sides extending endwise thereof, the inner surfaces of the legs tapering outwardly from a flat center surface between the legs whereby the wedge is adapted for resting on a steeple back bearing.

8. A wedge as set forth in claim 5 wherein the elastomeric material is spaced from the crown, and wherein the segment containing the crown is the largest segment of the wedge.

9. A wedge as set forth in claim 8 wherein there are three segments and two strips, said strips being substantially parallel to said ends.

References Cited by the Examiner

UNITED STATES PATENTS

| 1,269,436 | 6/1918 | Heyman | 308—187.1 |
| 3,083,065 | 3/1963 | Hinks et al. | 308—237 |
| 3,222,111 | 12/1965 | Thomas | 308—54 |

MARTIN P. SCHWADRON, *Primary Examiner.*

R. F. HESS, *Assistant Examiner.*